3,097,956
CYANOETHYLATED CELLULOSE SOLUTIONS
Kenneth W. Saunders, Darien, and Norbert M. Bikales, Stamford, Conn., assignors to American Cyanamid Company, New York, N.Y., a corporation of Maine
No Drawing. Filed Nov. 7, 1960, Ser. No. 67,457
5 Claims. (Cl. 106—169)

This invention relates to new solutions of certain highly-cyanoethylated celluloses. It is more particularly concerned with such solutions of highly-cyanoethylated cellulose derivatives containing more than two cyanoethyl groups per anhydroglucose unit.

Cellulose, both natural and regenerated has been reacted in various ways with acrylonitrile to produce cyanoethylated derivatives. Physical properties of the resultant products vary with such factors as the nature of the cellulose, the method of treatment and the like. However, they are affected most noticeably by the amount of cyanoethylation. This is usually measured or defined either by a nitrogen analysis expressed in weight percent, or by a decimal fraction representing the number of cyanoethyl groups introduced per anhydroglucose unit. The latter is usually referred to as the "degree of substitution." Both terminologies will be used in this specification, the latter being abbreviated as D.S. Complete substitution would correspond to a D.S. of 3.0 or a nitrogen content of about 13.1 weight percent.

In general, the products may be classified into several general types. The first type has a low degree of substituiton, not exceeding two, and usually has a low nitrogen content of from about 2.5 to about 6.5%, i.e., a D.S. of from about 0.3 to about 1.0. In this type, the fibrous structure of the cellulose is retained in substantially its original physical form. So-treated fibers remain useful in the textile, paper and other fields for which the original fibrous material was suited. Cyanoethylation to this degree of substitution, however, has improved many properties of the fiber such as resistance to microorganisms, heat, abrasion and the like.

However, when higher degrees of cyanoethylation are produced the characteristics of the product begin to change. As the D.S. increases above about two, the loss of fibrous characteristics and the resemblance of the product to a thermoplastic becomes increasingly noticeable. Moreover, the product begins to become soluble in certain organic solvents.

These characteristics become dominant in products having a D.S. from about 2.5 to 3.0, i.e., nitrogen content percentages of from about 12 to somewhat over 13. It is with products of this highly-cyanoethylated type having a D.S. of at least 2.5 with which the present invention is particularly concerned. However, it does have some applicability to products having a somewhat lower D.S. In some cases it may be applicable with a D.S. as low as about 2.3.

Highly-cyanoethylated celluloses, i.e., those having a D.S. above 2.5 have very desirable electrical characteristics for a number of purposes. Among these are a high dielectric constant, a low dissipation factor and the like. However, a problem is involved which hitherto has seriously hampered the commercial utilization of these highly-cyanoethylated products to take advantage of such properties. Before this can be done, the product must be formed into a film or other product. This, in turn, introduces the problem of preparing a solution containing a usefully-high concentration of the highly-cyanoethylated product. Moreover, such a solution must be capable of preparation in a reasonable length of time and such solution must not have an excessively high viscosity.

As was pointed out above, increasing the D.S. of the product increases its resemblance to an organic solvent soluble thermoplastic. However, this does not mean such a product becomes readily soluble. It does exhibit solubility to limited extents in such ketone solvents as acetone, diethyl ketone, methylethyl ketone and the like. It is also soluble to some extent in such solvents as dimethyl formamide and the like. None, however, are wholly satisfactory for practical use. Dimethyl formamide, for example, has a rather high boiling point which makes it difficult to remove from a cast film. This can be an important consideration in electrical applications. Others will not produce the desired concentration or produce excessively viscous solutions. Still others are too hygroscopic for industrial utility.

In the past, efforts have been made to overcome the problems by the attempted use of mixed solvents. Prior to this invention perhaps the best results were obtained by applicants in the use of a mixture of about equal parts of a ketone and dimethyl formamide. This mixture is referred to as "Solvent KD" in this discussion and is used as a basis of comparison in describing the present invention.

While solutions of some ten to twelve percent concentration can be obtained using this mixed solvent, a long time is required to dissolve even enough cyanoethylated cellulose to form a five percent solution. Moreover, economic considerations require reuse of the solvents which is rendered difficult in the case of mixed solvents of varied volatility. Moreover, the viscosities of the resultant solutions generally are higher than desirable for the concentration. Therefore even mixed solvent solutions are not wholly satisfactory.

In this connection it should be noted that cellulose is not a uniform material. Different forms of cellulose may have different molecular weights. The same is true of synthetic products derived therefrom, such as, for example, the regenerated cellulose of viscose rayon. As a result, the behavior of cyanoethylated products derived therefrom also may vary markedly in their ease of solubilization. This creates a still further problem in utilizing such materials on an industrially practicable basis. There remains, then, a need for a more effective solvent, one which is markedly less hampered by these problems which are presented in using the solvents and solvent mixtures previously considered the best available for the purpose.

The present invention fulfills this need. It is based on the discovery that acetonitrile has a remarkable solvent power for highly-cyanoethylated cellulose, whether derived from natural cellulose fibers or from regenerated cellulose. Surprisingly, using this novel solvent, it is readily possible to obtain solute contents as high as twenty percent or higher.

A further advantage is found in that for a given dissolved content of highly-cyanoethylated cellulose, the solution viscosity of acetonitrile solutions is relatively low. This is true even when compared with solutions of much lower concentration obtained with solvents and solvent mixtures such as were previously utilized. Clear, uniform, easily-flowable solutions are readily obtainable, even with high concentrations of cyanoethylated material.

Another advantage of the use of acetonitrile as a solvent according to the present invention is obtained by reason of its high volatility. When the solutions of the present invention are used in film-forming operations, for example, the solvent is readily removed and recovered for reuse.

It is an advantage of the present invention that a specially purified and expensive grade of acetonitrile is not necessary. It is desirable that the moisture content should not exceed about one percent. Commercially-available material meeting this requirement is readily obtainable. Products of lower moisture content are desirable but, except in special cases, are not essential.

Clarity and uniformity of solution also are important considerations. When as frequently occurred in the past, the solvent leaves even a few undissolved gel particles, the resultant solutions are not satisfactory. Films and other physical forms cast from such solutions are not homogeneous and do not exhibit the desired electrical and mechanical properties. It is a further advantage of the solutions of the present invention that they are not subject to this difficulty.

The invention will be more fully described in conjunction with the following illustrative examples. Therein, all parts and percentages are by weight unless otherwise specified.

EXAMPLE 1

Using a sample: solvent ratio of 19:1, a series of five samples of highly-cyanoethylated cellulose, in which the nitrogen percentages varied in the range from 12.1 to 12.6, were dissolved into 5% solution in the acetonitrile of the present invention. For comparison similar tests were made with acetone and with mixed solvent. Using acetonitrile, in accordance with this invention, each sample is readily dissolved to form a clear solution in one hour or less. In the same period of time both acetone and Solvent KD dissolved only a small amount of the solid leaving undissolved gel in suspension. Accordingly, both the acetone and the Solvent KD tests were allowed to remain in the mixer overnight. Illustrative results are shown in the following table.

*Table I*

SOLUBILITY, NITROGEN CONTENT AND DEGREE OF SUBSTITUTION

| Sample | Wt. Percent Nitrogen | D.S. | Solvent | Solubility |
| --- | --- | --- | --- | --- |
| A | 12.1 | 2.55 | Solvent KD | Soluble.[1] |
| A | 12.1 | 2.55 | Acetone | Do.[1] |
| A | 12.1 | 2.55 | Acetonitrile | Readily Soluble. |
| B | 12.5 | 2.7 | Solvent KD | Soluble.[1] |
| B | 12.5 | 2.7 | Acetonitrile | Readily Soluble. |
| C | 12.5 | 2.7 | Solvent KD | Incomplete. |
| C | 12.5 | 2.7 | Acetone | Insoluble. |
| C | 12.5 | 2.7 | Acetonitrile | Readily Soluble. |
| D | 12.5 | 2.7 | Solvent KD | Incomplete. |
| D | 12.5 | 2.7 | Acetonitrile | Readily Soluble. |
| E | 12.6 | 2.75 | Solvent KD | Incomplete. |
| E | 12.6 | 2.75 | Acetonitrile | Readily Soluble. |

[1] Only with difficulty and extended mixing time.

Although each of Samples B, C and D had a nitrogen content of about 12.5%, they were different samples, obtained from different sources. As is readily seen, they behaved differently. Table I also shows that the more highly-cyanoethylated materials present severe problems of solubility even using solvent mixtures, although when using acetonitrile clear solutions are readily obtained in all cases in a small fraction of the time.

EXAMPLE 2

Using additional portions of Sample C of Example 1, an attempt was made to produce solution concentrations of five, ten and twenty percent in acetonitrile. Sample and solvent were placed in a mechanically-stirred mixer and held for one hour at room temperature. Using acetonitrile as the solvent, complete solution was readily obtained in each case.

Attempts were made to repeat the experiment using a wide variety of solvents. Illustrative results are shown in the following table. Therein "Solvent AM" is used to indicate a mixture of equal parts by weight of acetone and methylethyl ketone, "Solvent AA" to indicate a mixture of equal parts of acetone and acetonitrile and "Solvent KD" to indicate a mixture of equal parts of ketone (acetone) and dimethyl formamide. A blank in any column indicates that the test at the next lower concentration was sufficiently unsatisfactory that an attempted test at higher concentrations was not warranted.

*Table II*

| Solvent | Solution Concentration | | |
| --- | --- | --- | --- |
| | 5% | 10% | 20% |
| Acetonitrile | Soluble | Soluble | Soluble. |
| Acrylonitrile | Some swelling | | |
| Proprionitrile | do | | |
| Methanol | Slight swelling | Slight swelling | |
| Ethanol: | | | |
| 95% | Insoluble | | |
| 100% | Slight swelling | Slight swelling | |
| Isopropanol | Insoluble | | |
| Acetone | Slightly soluble | | |
| Methylethyl ketone | Insoluble | | |
| Solvent AM | Soluble [1] | Insoluble | |
| Solvent AA | do | Soluble [2] | |
| Solvent KD | do | do [2] | Insoluble. |
| Ether | Insoluble | | |
| Dioxane | Some swelling | | |
| Pyrrolidone | Gel | | |
| Pyridine | Soluble | Soluble [1] | Do. |
| Tetrahydrofuran | Some swelling | | |
| Chloroform | do | | |
| Ethylene dichloride | do | | |
| Diethylamine | Insoluble | | |
| Dimethylformamide | Soluble | Soluble | Do. |
| Ethyl acetate | Some swelling | | |
| Cyclohexane | Insoluble | | |

[1] Some undissolved gel particles.
[2] With difficulty.

It will be seen that Wolvent KD, Solvent AA (containing 50% of acetonitrile, pyridine and dimethylformamide were capable of producing ten percent solutions.

Only the acetonitrile produced the desired complete solubility at twenty percent concentration. It should be noted that propionitrile, even though closely allied to acetonitrile in structure and molecular weight, is quite useless as a solvent for highly-cyanoethylated cellulose.

Even though several of the solvents are capable of producing ten percent solutions, these solutions are not industrially satisfactory. The acetonitrile-acetone mixture, for example, has too low a solution rate and the product solution has too high a viscosity. Pyridine is not only a disagreeable solvent to handle, but produces ten percent solutions that are too viscous to pour or even to be pumped. Dimethylformamide and mixed solvent solutions also are subject to the same viscosity problems.

The following example is given to illustrate the relative viscosity of solutions in acetonitrile as compared with those in pyridine. The latter is taken as illustrative of those other solvents noted above as capable of producing ten percent solutions but having excessive viscosity.

EXAMPLE 3

A sample of cyanoethylated cellulose prepared from viscose rayon was obtained containing 12.4 percent nitrogen. It was dissolved into clear ten percent solution in acetonitrile and in pyridine. The pyridine solution was filtered to remove some undissolved gel particles. Viscosity of both solutions was measured at room temperature by means of a rotating spindle instrument, commercially-available type called a Brookfield viscosimeter. Viscosity of the acetonitrile solution was 2600 centipoises, that of the pyridine solution 12,300 centipoises.

EXAMPLE 4

It was attempted to repeat Example 3 with twenty percent solutions. Solution in pyridine could not be obtained even after 15 hours. A solution in acetonitrile was readily obtained. It had a viscosity of 36,000 centipoises, measured as in Example 3.

In the following example, the utility of the solutions of the present invention in forming films and sheets of highly-cyanoethylated cellulose is illustrated.

EXAMPLE 5

A further sample of the same cyanoethylated cellulose of Sample A in Table I (12.1% nitrogen; D.S.=2.55), was dissolved in commercial grade acetonitrile (moisture 1% maximum) to give a 10% solution. Resultant solution was filtered under pressure through a filter capable of removing particles greater than 5 microns. Resultant clarified solution was spread in a uniform film on an electrically conductive glass surface by means of a doctor blade. The thickness of the liquid film was regulated to give a final solvent-free film of approximately two mil thickness. The solvent was evaporated in a dust-free chamber through which dry nitrogen was circulated. Drying temperature was regulated to 40° C. for four hours, followed by a one hour period of 130° C. Resultant solvent-free film was then vacuum metallized. Electrical measurements on the capacitor obtained at 25° C., and 60 cycles per second indicated a dielectric constant of 14.8 and a dissipation factor of 0.019 for the cyanoethylated cellulose film.

EXAMPLE 6

The procedure of Example 5 was repeated, except that the dry film before metallization was removed from the glass by the action of warm water. After drying and conditioning at 23° C., and 50% relative humidity, 10" by 0.5" strips were tested for physical strength. Average values were 5380 pounds per square inch and nine percent elongation.

We claim:

1. A clear solution in acetonitrile of cyanoethylated cellulose having at least 2.3 cyanoethyl groups per anhydro glucose unit, the dissolved cyanoethylated cellulose content being at least about 5% by weight.

2. A solution according to claim 1 in which the dissolved cyanoethylated cellulose content is at least about ten percent by weight.

3. A solution according to claim 2 in which said solution has a ten percent concentration and a viscosity less than about 3000 centipoises.

4. A solution according to claim 1 in which the dissolved cyanoethylated cellulose content is at least twenty percent by weight.

5. A method of preparing a clear uniform sheet of cyanoethylated cellulose containing from about 11.5 to about 13 weight percent of nitrogen and having at least 2.3 cyanoethyl groups per anhydroglucose unit which comprises: dissolving a cyanoethylated cellulose having the desired nitrogen content to a clear solution in acetonitrile, said solution having a dissolved cyanoethylated cellulose content of at least ten weight percent; casting a film of resultant solution on a suitable surface and removing substantially all the acetonitrile from said film.

References Cited in the file of this patent

MacGregor: J. Soc. Dyers Colorists, vol. 67, 1951, page 70.

"Chemistry of Carbon Compounds," edited by E. H. Rudd, vol. IA, 1951, page 606.

Doolittle: "The Technology of Solvents and Plasticizers," 1954, page 727.